United States Patent Office 2,983,626
Patented May 9, 1961

2,983,626

SULFUR TETRAFLUORIDE AS A SURFACE TREATING AGENT

Allan Kenneth Schneider and John Cunningham Thomas, Wilmington, Del., assignors to E. I. du Pont de Nemours and Company, Wilmington, Del., a corporation of Delaware No Drawing. Filed Aug. 20, 1957, Ser. No. 679,153

26 Claims. (Cl. 117—106)

This invention relates to the treatment of organic polymeric materials which contain hydroxyl groups, and the products obtained therefrom.

Polymeric compositions which contain hydroxyl groups form an important group of articles of commerce. Examples of such compositions are cotton, wood, cellulose, cellulose esters and ethers, starch and starch derivatives, vinyl alcohol homopolymers and copolymers and partially hydrolyzed vinyl acetate homopolymers and copolymers. The properties of such compositions are frequently adversely affected by contact with liquid water or by exposure to a highly humid atmosphere. When exposed to liquid water, they may permit the water to pass through readily or they may absorb the water rapidly. The compositions may dissolve in the water, swell excessively, lose tenacity, become stained, or if a powder, form lumps.

Many processes have been proposed for increasing the water-repellency of the hydroxyl-containing polymeric compositions. These processes frequently have an undesirable effect on the color, texture, strength, toughness or porosity of the composition. Many of the processes are complex and require special pre-treatment of the material to obtain satisfactory results.

In the present invention polymeric compositions which contain a plurality of alcoholic hydroxyl groups are brought into contact with sulfur tetrafluoride. The principal and most marked effect of the treatment of the polymeric compositions with sulfur tetrafluoride is to confer water-repellency on them or to increase their water-repellency. Other advantageous properties may be imparted by this process, however, such as rendering the compositions less soluble in certain organic solvents. In one mode of operation of the invention, the material to be treated is brought into contact with gaseous sulfur tetrafluoride under substantially anhydrous conditions. In another mode of operation, the hydroxyl-containing material is immersed in a solution of sulfur tetrafluoride in a liquid which is normally non-reactive toward the fluoride. In either method, there may be present an acceptor for hydrogen fluoride.

In the operation of the process, the hydroxylated composition is preferably dried before treatment with sulfur tetrafluoride. The treated composition can, after exposure to air or any non-reactive gas for a short time, be used without further processing or it can be washed with a suitable liquid, for example, a hydrocarbon or halohydrocarbon, to remove traces of retained sulfur tetrafluoride.

Hydroxyl-containing materials which are operable in the process are organic polymers which contain a plurality of recurring alcoholic hydroxyl groups which can occur at regular or random intervals in the polymer. The number of alcoholic hydroxyl groups present is not critical but maximum change in water-repellent properties will obviously be obtained in compositions in which initially there are a large number of alcoholic hydroxyl groups. The hydroxyl equivalent of the polymeric material, that is, the molecular weight of the composition divided by the number of hydroxyl groups, can be as low as about 30 or as high as about 700; preferably it lies between about 40 and about 600. The material to be treated may contain plasticizers, fillers or other ingredients which are preferably inert to sulfur tetrafluoride.

The molecular weight of the polymeric composition is not critical; it can be low, for example, as low as 1000, or can be as high as several million. The molecular weight is preferably at least 4000.

The polymers used in the process are normally solid at average air temperatures although this property is not essential for operability of the process. Hydroxylated polymeric compositions which occur in nature or are derived from natural sources are especially suitable for treatment with sulfur tetrafluoride and constitute a preferred group of compositions. An especially suitable group are the polysaccharides, particularly starch and cellulose and their derivatives which contain unreacted hydroxyl groups.

Hydroxylated polymeric compositions which contain other substituents in addition to the hydroxyl groups are operable in the process but may, if such groups are reactive with sulfur tetrafluoride, require the use of more sulfur tetrafluoride to impart water-repellency than polymeric compositions which contain hydroxyl groups as the sole substituents.

The polymeric compositions can be mixtures of hydroxylated and non-hydroxylated polymers.

Examples of solid compositions which may be used in the process are cellulose, cellulose derivatives, wood in various forms, starch, starch derivatives, fully or partially hydrolyzed polyvinyl acetates and fully or partially hydrolyzed copolymers of vinyl acetate with olefins such as ethylene. The preferred compositions for use in the process contain cellulose, regenerated cellulose, or cellulose derivatives, including esters and ethers of cellulose having unreacted hydroxyl groups.

The process can be applied to materials in any shape or form. For example, the sulfur tetrafluoride can be used to treat films, fabrics, fibers, paper, powders, coarse aggregates or large shaped articles.

Sulfur tetrafluoride, which is used here as the treating agent, can be prepared by methods described in the literature (Brown and Robinson, J. Chem. Soc. 1955, 3147–51).

The process of the invention is conducted under substantially anhydrous conditions in either a batch or continuous flow process. The reaction chamber is preferably made of material which is resistant to chemical attack by sulfur tetrafluoride, for example, platinum, stainless steel or borosilicate glass, and which is equipped with intake and exit lines.

In the preferred mode of operation, the composition is suspended in the reaction chamber, which is then flushed with an inert gas, for example, nitrogen, to remove air and moisture. Gaseous sulfur tetrafluoride is then passed into the chamber for a predetermined length of time and allowed to circulate around the composition to be treated. Sulfur tetrafluoride can be employed in pure form or it can be used in admixture with an inert gas, for example, nitrogen. If desired, the reaction chamber may be connected to a condenser which is cooled to a temperature low enough to liquefy the sulfur tetrafluoride which then collects on the bottom of the reaction chamber and, by refluxing, maintains a constant supply of vapor around the composition. The quantity of sulfur tetrafluoride used in the process is not critical. It can be as low as about 2.0% by weight of the hydroxylated polymer or as high as 100 times the weight of the polymer or even higher. Excess sulfur tetrafluoride is not detrimental and any unreacted sulfur tetrafluoride can be recovered by conventional means and used again in the process.

Optionally, the composition may be immersed in a solution of sulfur tetrafluoride in a non-reactive solvent. Examples of suitable solvents are diethyl ether, dibutyl ether, dioxane, hexane, cyclohexane, ligroin, and benzene. The solution can penetrate the composition and thus provide an effective means for contact and reaction between the composition and sulfur tetrafluoride. The concentration of sulfur tetrafluoride in the solution is not critical and can be as low as about 1.0% by weight or as high as 50% or higher. Preferably, the quantity of solution used is sufficient to cover the hydroxylated composition or that portion of the composition with which it is desired to effect reaction.

Small amounts of hydrogen fluoride may sometimes be formed during the operation of the process. A hydrogen fluoride acceptor can be used in the process but it is not essential that such an acceptor be present for successful operation. Examples of suitable acceptors are sodium fluoride, potassium fluoride, rubidium fluoride and cesium fluoride.

The time of the reaction can vary widely and will be determined primarily by the number of hydroxyl groups present in the polymeric composition and by the degree of water-repellency which is desired in the treated product. The time can be as short as 5 minutes in a batch process, or it can be as long as 10 hours or more. In general, the longer periods of treatment result in imparting greater water-repellency to the product. An excessively long period of treatment is generally not advantageous and can result in degradation of the polymeric composition.

The temperature of the reaction is kept as low as operability permits. It generally does not exceed 50° C. and preferably lies between about −20° C. and about 30° C. No additional advantage is gained by operating below about −20° C. and this temperature represents a practical lower limit. Temperatures higher than 50° C. are suitable in the treatment of some materials. The upper temperature limit is determined by the point at which substantial degradation of the polymeric composition occurs.

The process can be conducted at atmospheric, subatmospheric or superatmospheric pressure. It is preferably conducted at atmospheric pressure because of convenience and satisfactory operability. When conducted under superatmospheric pressure, the process is generally operated at lower temperatures and for shorter periods of time than when it is conducted at atmospheric pressure. Pressures up to 10 atmospheres or higher can be used.

The conditions used for a continuous process are similar to those described above for a batch process. The polymeric compositions can be exposed to sulfur tetrafluoride in the vapor state or in solution, using procedures for continuous operation that are well known in industry.

The treated polymeric composition can be freed of excess sulfur tetrafluoride by simple exposure to air or to the flow of an inert gas, for example, nitrogen. Alternatively, the composition can be washed with a solvent, for example, ether, alcohol, acetone or water and then dried in air.

The process of the invention is particularly useful in obtaining paper and cellophane films which repel liquid water but permit the passage of water vapor, cotton fabric which resists spotting, wood-surfaces which remain dry on exposure to moisture, and free-flowing powders. The treated products can and usually do contain small amounts of sulfur and fluorine but the amounts of each of these elements present in the treated product will vary with the conditions of treatment and with the nature of the hydroxyl containing composition. The amounts of sulfur and fluorine present in the treated product can be so small as to be substantially undetectable or they can be as high as 10–15% by weight. The manner in which any sulfur or fluorine is bonded in the treated composition is not known.

A preferred group of products are water-repellent compositions containing cellulose and cellulose derivatives which are obtained by the process of the invention. An expecially preferred group of products are the treated compositions which contain cellulose and cellulose derivatives and which further contain significant amounts of sulfur and fluorine inextractable from the compositions.

The following examples illustrate the process of the invention.

*Example I*

A. A thimble, 33 mm. in diameter and 94 mm. long, made of highly purified cellulose, was suspended in a glass reaction chamber which was equipped with a gas inlet tube, a thermometer, and a condenser which could be cooled with a solid carbon dioxide-acetone mixture. Dry nitrogen gas was passed through the entire system for at least 30 minutes at ambient temperature (about 25° C.) with no coolant in the condenser. The flow of nitrogen gas was stopped and gaseous sulfur tetrafluoride was admitted rapidly into the system. Solid carbon dioxide-acetone mixture was supplied to the condenser and the flow of sulfur tetrafluoride was continued until about 10 parts of refluxing liquid sulfur tetrafluoride had collected in the bottom of the reaction vessel. The sulfur tetrafluoride was allowed to reflux for one hour, additional sulfur tetrafluoride being added as needed. During this time the cellulose thimble was exposed to the vapors of sulfur tetrafluoride at a temperature of 15–25° C. At the end of the treatment period, nitrogen gas was again passed through the reaction vessel for at least 30 minutes to purge the system of sulfur tetrafluoride. The treated thimble was allowed to stand in air at about 25° C. overnight. It was water-repellent, as shown by the fact that a drop of water placed on the surface was not absorbed and that it held liquid water for at least 20 hours before any seepage occurred. An untreated thimble absorbed a drop of water immediately and allowed liquid water to pass through rapidly.

Analysis of a thimble treated as described above showed that it contained 0.16% sulfur and 0.54% fluorine.

B. A cellulose thimble was treated as described in part A except that it was exposed for 6 hours to the sulfur tetrafluoride vapors. The longer time of treatment imparted a higher degree of water-repellency to the cellulose as shown by the fact that the treated thimble held liquid water for 56 hours before seepage occurred. The treated thimble contained 0.06% sulfur and 0.23% fluorine.

C. A section of hard filter paper made of cellulose was treated as described in part A. The treated paper was water-repellent, as shown by the fact that it did not absorb a drop of water, but it was highly permeable to water vapor as determined by conventional tests.

D. A section of soft filter paper made of cellulose was treated as described in part A. The treated paper was water-repellent, as shown by the water-drop test, and retained its water-repellency for a period of at least 5 months while exposed to the air at ambient temperatures (about 25° C.).

*Example II*

The reaction vessel of Example I and cellulose thimbles similar to those described in Example I were used in the following experiment. Two thimbles were placed in the bottom of the reaction vessel, which was then purged with nitrogen gas for 30 minutes. The thimbles were then covered with ethyl ether, and sulfur tetrafluoride was passed into the ether until an 11% solution had been formed. After one hour at about 25° C., one thimble was removed, washed with ether and dried in a stream of nitrogen gas. It was shown by analysis to contain 0.09% fluorine but no measurable quantity of sulfur. After 6 hours at about 25° C., the second thimble was removed, washed and dried in the same manner. The thimble treated for one hour held liquid water for 30 minutes; the thimble treated for 6 hours held liquid water for 2 hours.

In each of the above examples, the treated products did not differ appreciably in color, texture or appearance from the untreated products. There was little or no evidence of degradation of the products.

*Example III*

A section of kraft paper (50-pound, unsized and unbleached) was treated with sulfur tetrafluoride as described in Example I, part A. The treatment markedly increased the water-repellency of the paper.

*Example IV*

Swatches were prepared of the following types of textile fabrics: cotton, polyethylene terephthalate staple (65%)-cotton (35%), continuous-filament viscose rayon, polyethathalate terephthalate staple (50%)-viscose rayon staple (50%), and polyacrylonitrile staple (70%)-viscose rayon stable (30%). Each of the swatches was treated individually with gaseous sulfur tetrafluoride in the reaction vessel as described in Example I, part A. The treated fabrics in each case were water-repellent. Drops of water which were placed on the surfaces of the treated fabrics retained their semispherical shape for significantly longer periods than drops of water placed on the surfaces of untreated fabrics. For example, drops of water placed on the treated fabric of polyethylene terephthalate staple (65%)-cotton (35%) retained their shape for over an hour whereas the drops of water on the surface of a section of untreated fabric disappeared very quickly.

*Example V*

A strip of plain non-moistureproof cellophane film was treated with sulfur tetrafluoride as described in Example I, part A. The treated film was water-repellent but the permeability of the film to water vapor was essentially unchanged. Wax applied to the surface of the film adhered well.

*Example VI*

A strip of commercial cellulose acetate film was treated by the process described in Example I, part A. The treated film curled but was insoluble in acetone whereas an untreated control dissolved readily in this solvent. The appearance of the film was not changed by the treatment. The treated film was shown by qualitative tests to contain a small amount of fluorine.

*Example VII*

Sections of red cedar, redwood and yellow pine were treated as described in Example I, part A. The treated sections of red cedar and redwood had the same appearance as the untreated sections; the treated section of pine was slightly darker than the untreated section. In each case, the treated section was more water-repellent than the untreated section.

Examples I through VII illustrate the application of the process to cellulose, cellulose derivatives and compositions which contain cellulose. The term cellulose is intended to include regenerated cellulose. The process can be applied to ethers and esters of cellulose generally. Materials which can be treated by the process of the invention include canvas, linen, burlap and broadcloth. Other compositions which can be treated are water-soluble methyl cellulose, ethyl cellulose, cyanoethyl cellulose, carboxy-methyl cellulose, cellulose propionate, cellulose butyrate, mixed cellulose acetate-propionate and cellulose nitrate.

*Example VIII*

A. A mixture of 3.8 parts of polyvinyl alcohol (medium viscosity, 99% hydrolyzed), 18 parts of sulfur tetrafluoride and approximately 35 parts of dry toluene was mechanically agitated in a sealed reaction vessel for 12 hours at 12–20° C. The reaction product was separated by filtration, washed and dried. There was obtained 4.1 parts of a brown powder which contained 6.82% sulfur and 10.48% fluorine. It was a free-flowing powder and was insoluble in boiling water. The polyvinyl alcohol used as a reactant was readily soluble in hot water.

The treated product is useful as an ingredient to reduce caking tendencies of dusts and solid dispersions.

B. Polyvinyl alcohol was treated as described in the preceding paragraph except that the temperature of treatment was from $-15°$ to $+15°$ C. The properties of the treated product were visually similar to those described under part A.

*Example IX*

A film was cast from a 10% aqueous solution of a polyvinyl alcohol which had been prepared by the partial hydrolysis (88%) of a high molecular weight polyvinyl acetate. The air-dried film was treated with sulfur tetrafluoride as described in Example I, part A. A drop of water placed on the treated film retained its semi-spherical shape for at least five minutes. When the drop was removed by absorption on filter paper, there was visible on the film only a slight opaque spot where the drop had been. A drop of water placed on an untreated film was almost completely absorbed in five minutes. When the excess water was removed by absorption on filter paper, a hole appeared in the film where the drop had been.

*Example X*

A mixture of 8.8 parts of polyvinyl alcohol (medium viscosity, 99% hydrolyzed), 22 parts of sulfur tetrafluoride, 10.1 parts of sodium fluoride and about 80 parts of anhydrous toluene was mechanically agitated in a sealed reaction vessel for 11 hours at 29 to 33° C. The product was poured into methanol, filtered, washed with methanol and dried. There was obtained 19.7 parts of a dull maroon powder which was insoluble in boiling water and boiling dimethylformamide.

Example X illustrates the operation of the process in which an acceptor for hydrogen fluoride is employed.

*Example XI*

There was added with stirring and cooling 10.8 parts of soluble starch (Baker and Adamson) to a solution of 25 parts of sulfur tetrafluoride in about 260 parts of benzene. The mixture was stirred at room temperature for four minutes, during which time it became brown. The solid was separated by filtration, washed with benzene, then with methanol, and dried. There was obtained 9.8 parts of a pale grayish-tan powder which was more free-flowing then the starting material after exposure to the atmosphere and which did not dissolve in hot water. The untreated starch was readily soluble in hot water. The treated starch powder is useful as an ingredient for reducing the caking tendencies of dusts and solid dispersions.

Examples VIII through XI illustrate the application of the process to non-cellulosic hydroxyl-containing polymers. Other hydroxyl-containing polymeric materials to which the process of the invention can be applied are amylose, amylopectin, lignin, 50% hydrolyzed polyvinyl acetate, hydrolyzed ethylene/vinyl acetate (1/1) copolymer and partially etherified starches, e.g., allyl starch.

As shown in the above examples, the process of the invention increases the water-repellency of hydroxyl-containing organic polymeric compositions and modifies properties to enhance their usefulness in the fields in which they are employed.

We claim:

1. The process of rendering a preformed organic polymeric material initially susceptible to swelling by water less susceptible to such swelling without substantial change in the physical form thereof which comprises contacting said polymeric material with sulfur tetrafluoride under substantially anhydrous conditions at a temperature between −20° C. and the degradation temperature of the material, said organic polymeric material having (a) a molecular weight of at least 1000, (b) a plurality of recurring hydroxyl groups, and (c) a hydroxyl equivalent of at least 30.

2. The process of claim 1 wherein the sulfur tetrafluoride is gaseous.

3. The process of claim 1 wherein the sulfur tetrafluoride is in solution in a nonreactive solvent.

4. The process of claim 3 wherein the nonreactive solvent is a member of the group consisting of diethyl ether, dibutyl ether, dioxane, hexane, ligroin and benzene.

5. The process of claim 1 accomplished in the presence of a hydrogen fluoride acceptor.

6. The process of claim 5 wherein the hydrogen fluoride acceptor is the fluoride of an alkali metal.

7. The product of the process of claim 1.

8. The process of claim 1 wherein the preformed organic polymeric material is a member of the group consisting of polysaccharides and ethers and esters thereof.

9. The product of the process of claim 8.

10. The process of claim 1 wherein the preformed organic polymeric material is cellulose.

11. The process of claim 1 wherein the preformed organic polymeric material is a cellulose derivative.

12. The product of the process of claim 11.

13. The process of claim 1 wherein the preformed organic polymeric material is starch.

14. The process of claim 1 wherein the preformed organic polymeric material is a starch derivative.

15. The product of the process of claim 14.

16. The process of claim 1 wherein the preformed organic polymeric material is a vinyl derivative.

17. The product of the process of claim 16.

18. The process of claim 1 in which the preformed organic polymeric material is also preshaped.

19. The process which comprises contacting cellulose with sulfur tetrafluoride and thereby improving the water-repellency of the same without substantial change in the physical form thereof.

20. The process of claim 19 wherein the sulfur tetrafluoride is gaseous.

21. The process which comprises contacting cellulose-based paper with gaseous sulfur tetrafluoride and thereby improving the water-repellency of the same without substantial change in the physical form thereof.

22. The process which comprises contacting cellulose-based paper with sulfur tetrafluoride in an inert reaction medium and thereby improving the water-repellency of the same without substantial change in the physical form thereof.

23. The process which comprises contacting a fabric containing a cellulose-based polymer with sulfur tetrafluoride and thereby improving the water-repellency without substantial change in the physical form thereof, said polymer having (a) a molecular weight of at least 1000, (b) a plurality of recurring hydroxyl groups, and (c) a hydroxy equivalent of at least 30.

24. The process which comprises contacting cellophane with sulfur tetrafluoride and thereby improving the water-repellency of the same without substantial change in the physical form thereof.

25. The process which comprises contacting polyvinyl alcohol of a molecular weight of at least 1000 with sulfur tetrafluoride, thereby improving the resistance of the same to water without substantial change in the physical form thereof.

26. The process which comprises contacting wood with sulfur tetrafluoride and thereby improving the water-repellency of the same without substantial change in the physical form thereof.

References Cited in the file of this patent

UNITED STATES PATENTS

| | | |
|---|---|---|
| 1,238,236 | Whittelsey | Aug. 28, 1917 |
| 1,672,157 | Herrmann et al. | June 5, 1928 |
| 2,307,045 | Iler | Jan. 5, 1943 |
| 2,360,477 | Dahle | Oct. 17, 1944 |
| 2,449,816 | Nichols | Sept. 21, 1948 |

OTHER REFERENCES

Miller et al.: Ind. and Eng. Chem., vol. 42, No. 11, November 1950, pp. 2223–2227.